United States Patent
Cantwell

(10) Patent No.: US 7,136,199 B2
(45) Date of Patent: Nov. 14, 2006

(54) DOCUMENT SCANNING APPARATUS WITH OVERSIZE DOCUMENT HANDLING CAPABILITY

(75) Inventor: Charles Eric Cantwell, Boise, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 1001 days.

(21) Appl. No.: 10/039,941

(22) Filed: Oct. 26, 2001

(65) Prior Publication Data

US 2003/0081267 A1    May 1, 2003

(51) Int. Cl.
*H04N 1/04* (2006.01)

(52) U.S. Cl. ............. 358/474; 358/486; 358/488; 358/496; 358/497; 358/498; 358/450

(58) Field of Classification Search ............... 358/497, 358/498, 494, 474, 486, 488, 482, 483, 487, 358/506, 505, 512–514, 496, 450; 399/211–213, 399/215, 376, 379, 380; 250/234–236, 208.1, 250/216, 239; 382/312, 318, 319, 284
See application file for complete search history.

(56) References Cited

U.S. PATENT DOCUMENTS

| | | | |
|---|---|---|---|
| 5,032,922 A * | 7/1991 | Stemmle | 358/296 |
| 5,923,445 A * | 7/1999 | Leou | 358/474 |
| 6,233,067 B1 * | 5/2001 | Itano et al. | 358/491 |
| 6,507,415 B1 * | 1/2003 | Toyoda et al. | 358/450 |
| 6,587,231 B1 * | 7/2003 | Sung | 358/497 |
| 6,690,482 B1 * | 2/2004 | Toyoda et al. | 358/1.2 |
| 6,894,813 B1 * | 5/2005 | Spencer et al. | 358/483 |

* cited by examiner

*Primary Examiner*—Cheukfan Lee

(57) ABSTRACT

A document scanning apparatus which is capable of scanning an oversized document. In one embodiment the document scanning apparatus includes a base unit, an optical scanning device located within the base unit, and a cover freely removable from the base unit. The apparatus further includes a document positioning device configured to move a document with respect to the optical scanning device when the document is positioned between the base unit and the cover.

36 Claims, 12 Drawing Sheets

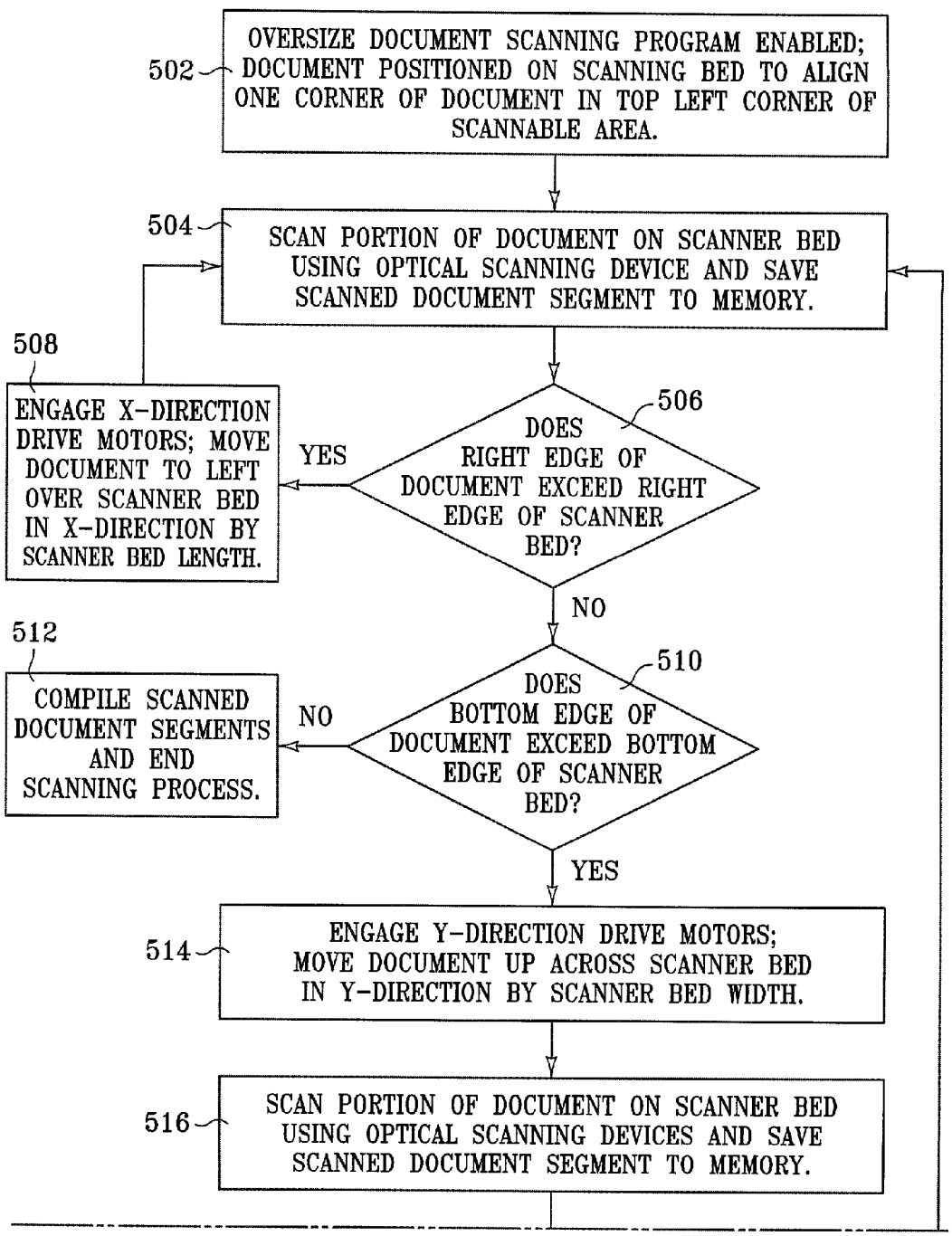

DOCUMENT SCANNING APPARATUS WITH OVERSIZE DOCUMENT HANDLING CAPABILITY

FIELD OF THE INVENTION

The invention claimed and disclosed herein pertains to apparatus for optically scanning documents, and more particularly to methods and apparatus to allow such document scanning apparatus to scan oversized documents.

BACKGROUND OF THE INVENTION

The present invention is directed towards document scanning apparatus. Such apparatus are configured to optically scan an essentially flat document using an optical scanning device. The optical scanning device generates a stream of signals as the document is scanned. The signals, typically in an analog form, can then be converted into a digital form using known analog-to-digital conversion techniques. The resulting digital signals collectively comprise a representation of the scanned portion of the original document, and can be stored as a digital file or processed to generate a copy or a displayed image of the original document. Further, the digital document file can be further processed to modify the digital representation of the original document. For example, the document file can be modified to resize or re-orient the document with respect to the format in which it originally appeared. Most document scanning apparatus are in the form of a flat-bed scanner. That is, the scanning apparatus includes a transparent (usually glass) platen on which a document can be placed. A cover, which is hingedly attached to the main body of the scanning apparatus, can be closed over a document placed on the platen in order to reduce ambient light intrusion which can adversely affect the quality of the scanned image. Once a document is placed on the platen, the optical scanning device is then moved past the platen in order to scan the document. In another configuration, a document scanning apparatus can include a document sheet feeder which is configured to feed one or more sheets of a document into position for optical scanning. Two common configurations are used. In the first configuration, the optical scanning device remains static while the document is moved past the scanning device. In the other configuration, a transfer device, such as a belt, is used to move the document onto the platen. The scanning device is then moved past the document to thereby scan the document, and the document is then subsequently removed from the platen by the transfer device. A hybrid configuration allows the scanning device to remain static when a sheet feeder is used to transfer the document to the scanning device, but when a document is manually placed on the platen, the scanning devices moves past the document. Although most document scanning apparatus have a platen over which a document can be placed for scanning, in a less common configuration no platen is provided, and the document is moved past a static optical scanning device by a sheet feeder. This latter configuration is commonly found in facsimile machines, which can also function as a scanning apparatus.

The advantage of the flat-bed scanning arrangement is that documents (as well as other objects) of various sizes and shapes, which cannot be easily accommodated by a sheet feeder, can be scanned. However, when a document to be scanned exceeds the size of the platen, certain problems result. Turning to FIG. 1, a prior art scanning apparatus 10 is depicted in a plan view. The scanning apparatus 10 is also depicted in a sectional side elevation view in FIG. 2. With reference to FIGS. 1 and 2, the prior art scanning apparatus includes a scanner base 30 and a scanner cover 12. The scanner base supports a platen 25 and an optical scanning device 28. The cover 12 is attached to the base 30 by hinges 14, allowing the cover to be moved in direction "Q" (FIG. 2) so that a document can be placed on the platen 25. In the embodiment shown, the cover 12 includes a sheet feeder. A sheet of media (such as paper) can be placed in the input tray 16 (FIG. 1). A pick-roller 24 (FIG. 2) can then engage the sheet of media and move it in feed direction "F" (FIG. 1) past the optical scanning device 28 (FIG. 2) using the feed rollers 26. The scanned sheet is then discharged at output area 27. Alternately, a sheet of media can be placed directly on the platen 25 and the optical scanning device 28 can be moved past the sheet using a scanner drive mechanism (not shown). As can be seen in FIG. 1, the sheet feeding section of the cover 12 can induced a fixed upper-edge document guide 18 and a moveable lower edge document guide 22 which is configured to move on track 22 in directions "A". A document sheet having a maximum width "W" can thus be accommodated by the sheet feeder. Typically, the width "W" is the maximum width of the scannable area of the platen 25 (i.e., the area which can be scanned by the scanning device 28). When a document is placed directly on the platen, then the scanning device 28 is limited to scanning an area of length "L" (FIG. 2).

Turning to FIG. 3, the prior art scanning apparatus 10 of FIGS. 1 and 2 is depicted in a plan view, but with the scanner cover 12 in an open position. Also depicted is an outline of an oversized document "D" which is positioned with the upper left corner "UL" of the document oriented in the upper left corner of the platen 25. The document "D", being of width "WD" and length "LD", is considered "oversized" since at least one of (and in this case, both) the length (LD) and width (WD) of the document "D" exceeds the respective length "L" and width "W" of the scannable area of the platen 25. As is evident, the optical scanning device 28 will not be able to scan the entire document "D" in a single scan.

When a sheet feeding device is used, such as is depicted in FIGS. 1 and 2, then a document with a document length "LD" greater than the scannable area length "L" can be scanned in a single pass, since the document can be moved past the optical scanning device 28 while the device 28 remains static. However, if the width "WD" of the document "D" exceeds the width "W" of the scannable area of the platen 25, then the sheet feeding device is of no help. Further, if the scanning apparatus 10 is not provided with a sheet feeder (typically at extra cost), then the optical scanner 28 will not be able to scan a document in a single pass where the length "LD" of the document "D" is greater than the length "L" of the scannable area. In the situation depicted in FIG. 3, a user is presented with essentially only one solution if the user desires to scan the entire area of the document "D". That is, the user must manually move the document "D" over the platen 25 a number of times in order to scan the entire area of the document. In the example depicted, the user will need to make a first scan in the position shown. The user will then need to shift the document to the left to encompass the upper right corner "UR" of the document, then shift the document up to encompass the lower right corner "LR" of the document, and then to the right to encompass the lower left corner "LL" (or some combination of these various movements).

The above-described movements of the document "D" of FIG. 3 by a user in order to completely scan the area of the document present a number of problems. First of all, the cover 12 presents an impediment to the document and to movement of the document. If the document "D" is of a relatively stiff media (such as cardstock), then the cover 12 can require bending of the document in order to place the document on the platen 25. This can result in damage to the document. While the document can conceivably be rotated to various positions to avoid interference by the scanner cover 12, and thus avoid bending the document, this is only feasible when the document length "LD" and the document width "WD" are each shorter than the platen length "L" and width "W". Removing the cover from the scanner base may be of some help in allowing the document to be moved around on the platen. However, this can require a significant amount of work and may result in damage to the scanning apparatus since the covers are typically not intended to be removed by a user. In addition, removing the cover will allow more light to intrude into the scanner during the scanning process, resulting in a low quality final image.

Further, while it is possible to scan the entire document by manually repositioning the document and making a plurality of scans, the result is a plurality of scanned images, rather than a single scanned image. In most instances, the user will desire a single scanned image. Accordingly, in order to acquire a single scanned image of an oversized document, a user will need to assemble a plurality of single scanned images to obtain a single scanned image. This can be done using known image processing software, but the process is difficult to do at best since matching the edges of the various scanned images requires significant image manipulation. Also, in many cases the user is merely guessing where to place the oversized document on the platen to scan the next segment, and the result can be overlapping portions between scanned images, or missing portions which require the user to re-scan the segment.

What is needed then is a document scanning apparatus which achieves the benefits to be derived from similar prior art apparatus, but which avoids the shortcomings and detriments individually associated therewith.

SUMMARY OF THE INVENTION

The present invention provides for a document scanning apparatus which is capable of scanning an oversized document. In a first embodiment of the present invention a document scanning apparatus includes a base unit, an optical scanning device located within the base unit, and a cover freely removable from the base unit. The apparatus further includes a document positioning device configured to move a document with respect to the optical scanning device when the document is positioned between the base unit and the cover.

A second embodiment of the present invention provides for a document scanning apparatus comprising an optical scanning device, a processor, and a document positioning device configured to position a document with respect to the optical scanning device. The apparatus further includes a document positioning program configured to be executed by the processor and to cause the processor to actuate the document positioning device, and thereby move the document with respect to the optical scanning device.

A third embodiment of the present invention provides for a method of optically scanning an oversized document. The method includes placing a first portion of the document over a platen so that a second portion of the document is not placed over the platen. The first portion of the document is then optically scanned by moving an optical scanning device past the first portion of the document. The method includes automatically moving the document in a first direction so that the second portion of the document is placed over the platen. The second portion of the document is then optically scanned by moving the optical scanning device past the second portion of the document.

These and other aspects and embodiments of the present invention will now be described in detail with reference to the accompanying drawings, wherein:

DESCRIPTION OF THE DRAWINGS

FIGS. 15A and 15B together form a flow chart depicting a series of steps that can be performed to implement the methods of the present invention.

DETAILED DESCRIPTION OF THE INVENTION

The present invention provides methods and apparatus which allow an oversized document to be entirely scanned without requiring a user to manually set the document on a document scanning apparatus a plurality of times and performing a plurality of optical scans of different portions of the document.

In the following discussion, when I say "document scanning apparatus" I mean an apparatus having an optical scanning device capable of optically scanning a document, or a portion thereof, to generate an electronic representation of the scanned document or document portion. By a "document" I mean a sheet of media which contains an image, such as text or a graphical image. For example, a document can be a sheet of paper. By the expression "oversized document" I mean a document in which at least one of the length and/or width of the document exceeds the respective length and/or width of the scannable area of the document scanning apparatus. By "scannable area" I mean an area defined on the scanning apparatus, and which can be scanned by the optical scanning device. An example of an oversized document is a poster measuring 2' by 3' (approx. 0.7 m by 1 m).

Figure 1:
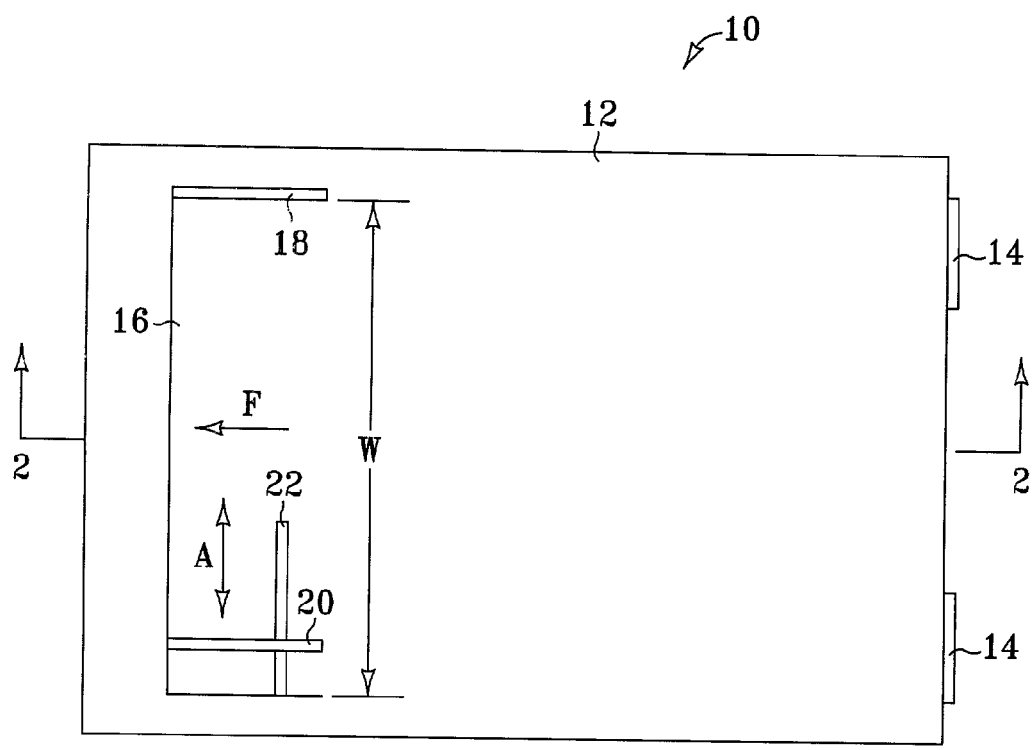
FIG. 1 depicts a plan view of a prior art document scanning apparatus.
Figure 2:
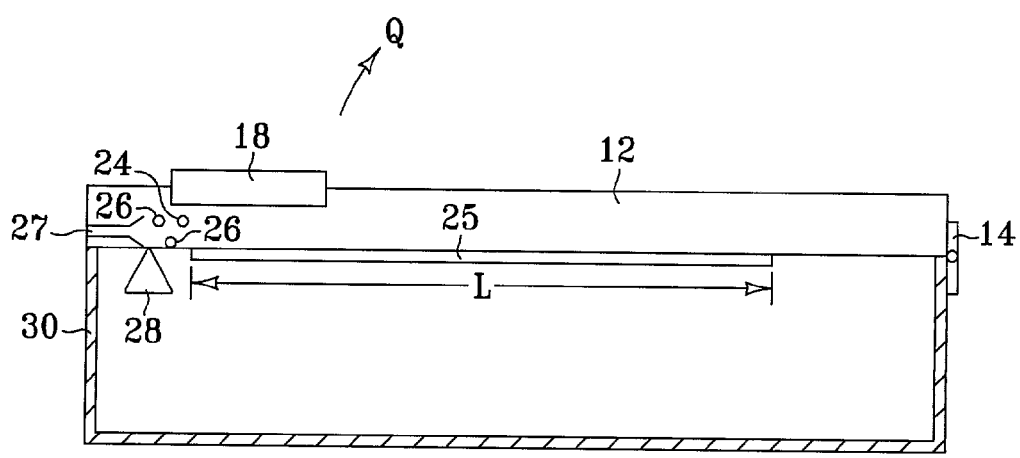
FIG. 2 is a side elevation sectional view of the prior art document scanning apparatus depicted in FIG. 1.
Figure 3:
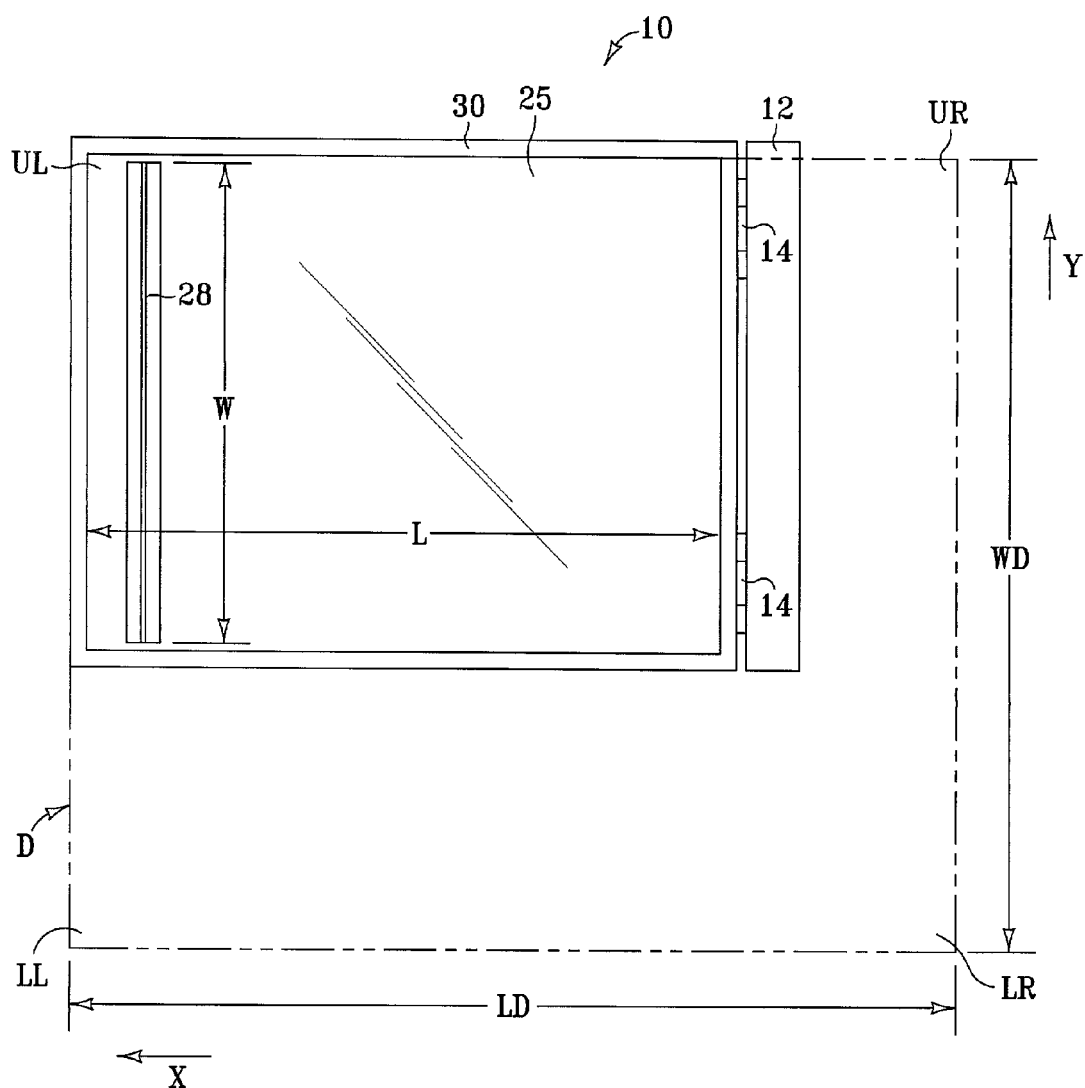
FIG. 3 depicts another plan view of the prior art document scanning apparatus of FIG. 1.

Generally, a document scanning apparatus in accordance with the present invention includes a base unit and a cover which is freely removable from the base unit. By "freely removable" I mean that the cover is not directly attached to the base unit, such as by hinges (see for example the prior art see hinges 14, FIG. 1). Preferably, the cover is configured to be lifted free of the base unit without requiring the use of tools or the like to detach the cover from the base unit. Although the cover of the present invention can be tethered to the base of the scanning apparatus by a cord or wire, this would still be considered "freely removable". More preferably, the removability of the cover allows a document to be placed over the base unit such that the edges of the document can overhang the base unit on any or all sides of the base unit. Accordingly, an oversized document can be placed on the base unit of the document scanning apparatus, and then the cover placed over the document so as to secure the document between the cover and the base unit. The document scanning unit includes an optical scanning device which can be located in the base unit, and a document positioning device configured to move the document with respect to the base unit and/or the optical scanning device. Preferably, the document scanning apparatus further includes an alignment device configured to maintain the cover in generally fixed spatial alignment with respect to the base unit when the document positioning device is moving a document. I will now describe specific examples of methods apparatus in accordance with the present invention.

Figure 4:
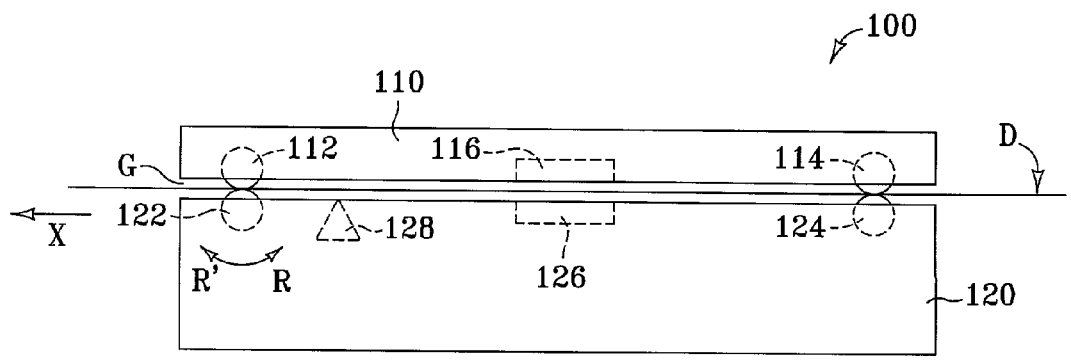
FIG. 4 is a side elevation view depicting a document scanning apparatus in accordance with one embodiment of the present invention.

Turning to FIG. 4, a document scanning apparatus 100 in accordance with the present invention is depicted in a side elevation view. The document scanning apparatus 100 includes a base unit 120 and a cover 110. As can be seen, in this example there is no physical connection between the base unit 120 and the cover 110, and the cover is merely resting on top of the base unit. For illustrative purposes, a document "D" is depicted as being positioned between the base unit 120 and the cover 110. The document scanning apparatus 100 further includes an optical scanning device 128 which is configured to optically scan a document. Preferably, the optical scanning device 128 is configured to move in a direction from left to right (and visa versa) to scan the document, and in this case the base unit 120 includes a platen (shown in FIG. 5 as 132, and described below). The document scanning apparatus 100 includes a document positioning device, which is depicted here as powered roller 122 which protrudes slightly above the base unit 120 such that a sheet of media (document "D") which is laid over the base unit contacts the powered roller 122. The powered roller preferably has a tactile surface so that it can engage the document "D" and move the document in direction "X" (or opposite-X) by rotation of the roller 122 in respective directions "R" or "R'". A complementary idler roller 112, which is located in the cover 110, rests against the powered roller 122, with the document "D" trapped between the rollers 122 and 112. The base unit 120 can further include a second roller 124, which is preferably (but not necessarily) a powered roller and which also protrudes slightly above the base unit 120, as does roller 122. A second idler roller 114, located in the cover 110, rests against the roller 124, with the document "D" trapped between the rollers 124 and 114 when the cover 110 is placed on the base unit 120. In this way, the cover 110 is supported only by the rollers 122 and 124, which are located in the base unit 120.

As can be seen, the configuration depicted in FIG. 4 is unstable in that the cover 110 will tend to move off of the rollers 122 and 124 once the powered roller 122 is engaged. Accordingly, the document scanning apparatus preferably includes an alignment device configured to maintain the position of the cover 110 relative to the base 120 as the document is moved about by the document positioning device 122. In the example depicted, the alignment device consists of a first magnet 126 which is located in the base unit 120, and a complementary second magnet 116 which is located in the cover 110 and which is proximate the first magnet 126 when the cover is positioned over the base unit 120. As can be seen by a plan view of the document scanning apparatus 100 (FIG. 5), in this example there are two magnets 126 located in the base unit 120. The magnetic attraction between the magnets 116 and 126 (FIG. 4) tends to maintain the cover in a constant position with respect to the base unit 120, but also allows the document "D" to completely isolate the base unit 120 from the cover 110. In this way the document "D" can be freely moved around over the base unit 120 without interference from the cover 110.

Figure 5:
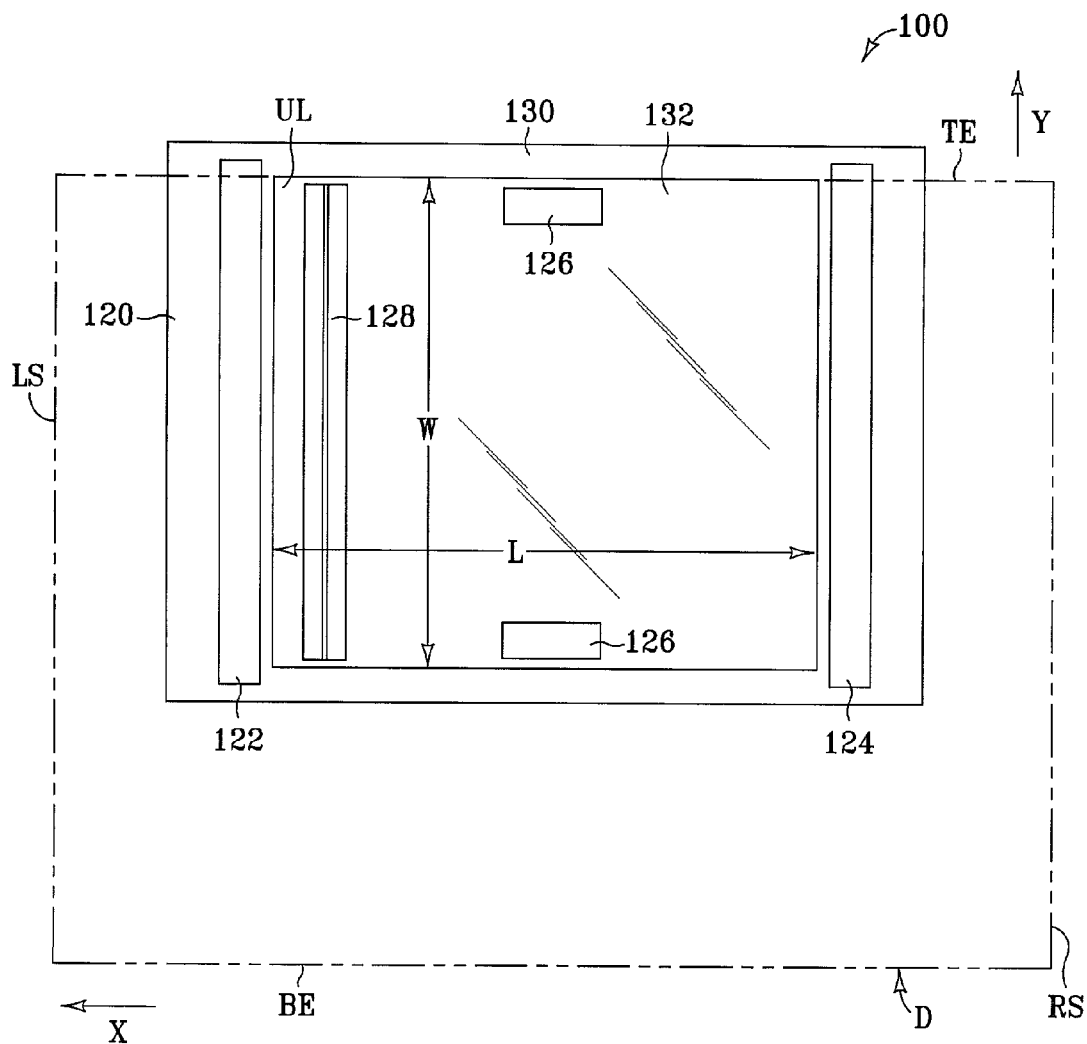
FIG. 5 is a plan view depicting the document scanning apparatus of FIG. 4.

In the plan view of FIG. 5, the cover 110 of the document scanning apparatus 100 of FIG. 4 has been removed so that only the base unit 120 can be seen. The base unit includes a transparent platen 132 over which a document can be placed, and then the cover can be placed over the document (as in FIG. 4). The document positioning device (powered roller 122) can then be actuated to more the document with respect to the platen 132 and the optical scanning device. In the example depicted in FIG. 5, an oversized document "D" (indicated in outline) is placed over the base unit 120. Preferably, the document "D" is initially placed with the top edge "TE" and the left side "LS" positioned in the upper left corner "UL" of the platen 132. The powered roller can then move the document "D in the direction "X" until the right side "HRS" of the document "D" is aligned with the right side of the of the platen 132. (A more complete description of the operation of the document scanning apparatus 100 will be provided further below.) It is evident that the configuration of the document scanning apparatus 100 depicted in FIG. 5 will not be able to automatically move the document "D" in direction "Y" so that the bottom edge "BE" of the document can be scanned, since the drive roller 122 can only move the document "D" in the X-direction, and in the opposite ("negative-X") direction. Consequently, a user will need to manually lift the document "D" from the base unit 120 and reposition it over the platen 132 in order to scan the area of the document between the bottom edge "BE" and the lower edge of the platen (defined by width "W"). However, in additional embodiments of the present invention, the document scanning apparatus can be configured to move the document "D" in both the "X" direction and the "Y" direction. Those embodiments will be described further below.

Figure 6:
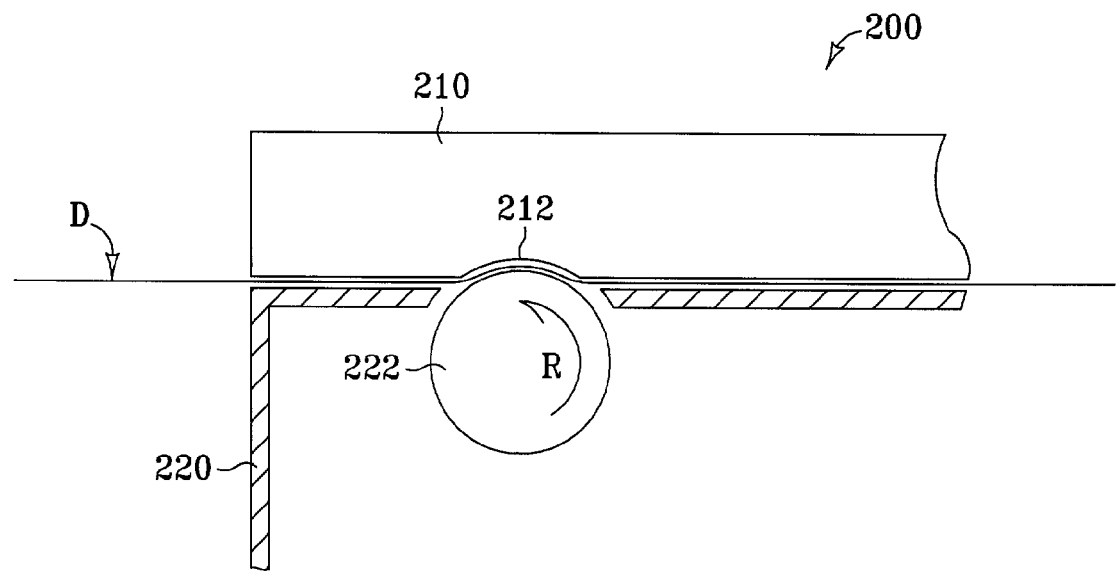
FIG. 6 is a side elevation sectional view depicting a document positioning drive device and a scanner cover alignment device which can be used with the present invention.

Turning to FIG. 6, an alternate configuration for an alignment device which can be used in a document scanning apparatus in accordance with the present invention is depicted. FIG. 6 shows a partial side elevation sectional view of a document scanning apparatus 200, having a base unit 220 similar to the base unit 120 of the document scanning apparatus 100 of FIG. 4. The base unit 220 includes a document positioning device 222, which is similar to the powered roller 122 of FIG. 4. However, the cover 210 of the document scanning apparatus 200 differs from the cover 110 of the apparatus 100 of FIG. 4 in that the alignment device in the cover 210 comprises an arcuate bearing surface 212 formed in the cover 210. The arcuate bearing surface 212 forms a pocket configured to receive at least a portion of the powered roller 222 therein when the cover 210 is aligned on the base unit 220. Preferably, the arcuate bearing surface 212 is covered with a low-friction coating (such as tetrafluoroethylene, or "TFE") to allow a document "D" to slide more easily over the surface 212.

Figure 7:
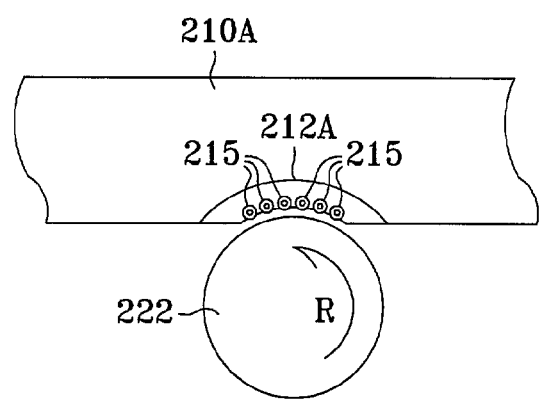
FIG. 7 is a side elevation view depicting another document positioning drive device and scanner cover alignment device which can be used with the present invention.

Yet another alternative configuration for an alignment device which can be used in a document scanning apparatus in accordance with the present invention is depicted in FIG. 7. FIG. 7 shows a powered roller 222 (the same as roller 222 of FIG. 6) which is located in a base unit (not shown). A cover 210A includes an arcuate surface 212A. Located within the cover 210A, and positioned such that they will be disposed between the arcuate surface 212A and the roller 222 when the cover 210A is placed over the base unit, are a plurality of parallel, spaced apart cylindrical bearings 215 configured to contact the powered roller 222 when the cover 210A is aligned on the base unit (not shown). Preferably, the cylindrical bearings are supported in the cover 210A such that they are free to rotate about a central axis, and thus roll as a document (not shown) is moved between the powered roller 222 and the cylindrical bearings 215. Although the cover 210A of FIG. 7 is depicted as having 6 cylindrical bearings, in fact only two are needed to straddle the powered roller 222 and thus align the cover 210A with respect to the base unit.

Although the rollers 122 and 124 in FIG. 5 are depicted as spanning the entire width of the platen 132, in fact each roller can be replaced with two or more shorter, spaced-apart rollers. As will be seen in the embodiment of the invention described immediately below, the rollers can be shaped such that the area of contact between the document and the roller is very small. Such will allow greater pressure to be applied by the roller to the document (since the weight of the cover will be distributed over a much smaller area on the document), facilitating movement of the document by the roller.

Figure 8:
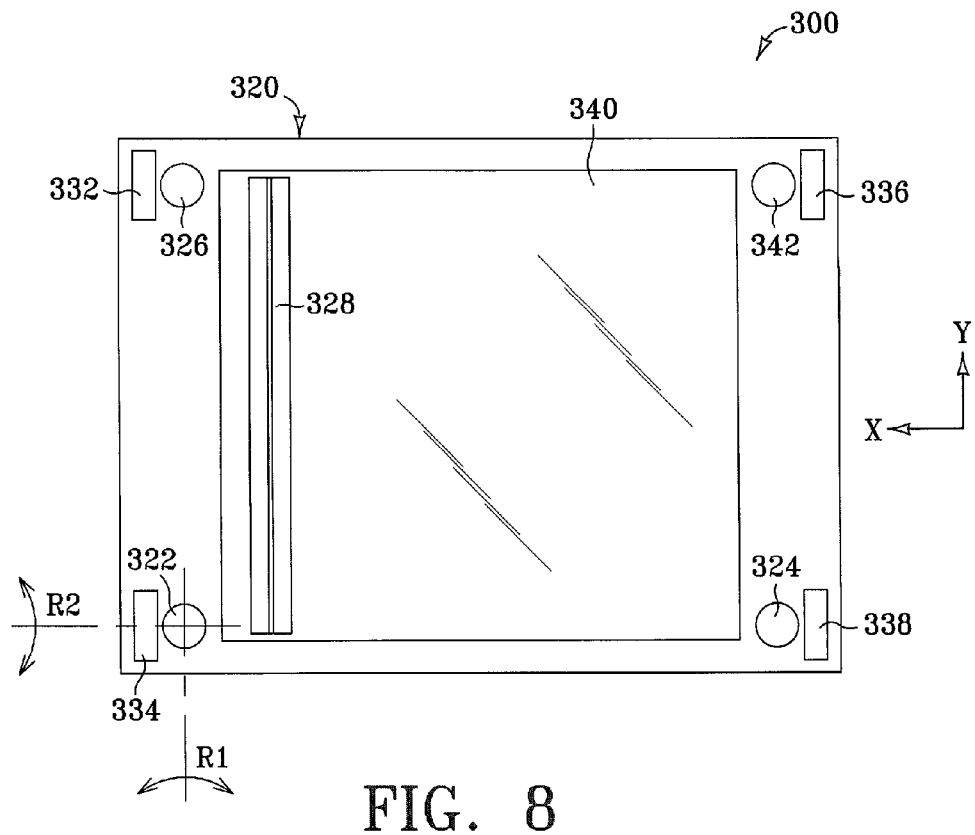
FIG. 8 is a plan view depicting a document scanning apparatus in accordance with a second embodiment of the present invention.

Turning now to FIG. 8, a second embodiment of a document scanning apparatus 300 in accordance with the present invention is depicted in plan view. For the sake of simplification, the cover is not shown, although the cover can be similar to the cover 110 of FIG. 4, except as modified per the following description. The document scanning apparatus 300 of FIG. 8 includes a base unit 320 which includes a platen 340 and an optical scanning device 328. The alignment device here includes four magnets (332, 334, 336 and 338) positioned adjacent the four corners of the base unit 320. In this instance, the cover (not shown) will have four complementary magnets positioned adjacent the corners of the cover so that they align with the four magnets in the base unit 320 when the cover is placed over the base.

The primary difference between the document scanning apparatus 300 of FIG. 8 and the apparatus 100 of FIG. 4 is the document positioning device. While the apparatus 100 only had a powered roller 122 which allowed movement of a document only in direction "X" (and the opposite direction, "negative-X", as described above with respect to FIG. 5), the document scanning apparatus 300 of FIG. 8 uses at least a first driven ball 322 located adjacent a first one of the four corners of the base 310. The driven ball is configured to be selectively rotatatable about a first axis in direction "R1" to thus move a document in the "X"/negative-X directions, as well as about a second axis in direction "R2" to thus move a document in the "Y" and negative-Y directions. The base can further include a second driven ball located adjacent a second one of the four corners of the base, such as ball 326, 324 or 342. Preferably, the base unit 320 includes four balls 322, 324, 326 and 342, at least one of which is driven, while the other balls are idler balls. In a preferred embodiment, all four balls 322, 324, 326 and 342 are driven, thus allowing improved control of the document positioning by the document positioning device, since the document will not be able to rotate about an idler ball while being positioned by a driven ball. Further, selected ones of the balls can be configured to drive the document in one direction, while other of the balls are configured to move the document in a second direction which is typically (but not necessarily) orthogonal to the first direction.

When balls 322, 324, 326 and 342 are used to support the cover (not shown) over the base 320 (similar to the depiction in FIG. 4), then the alignment device can be similar to the alignment devices depicted in FIGS. 6 and 7. For example, with respect to FIG. 6, if the arcuate surface 212 is cup-shaped to receive one of the balls 322, 324, 326 and 342, then the document "D" can be placed between the ball and the arcuate surface. With respect to FIG. 7, the cylindrical bearings 315 can be replaced with a series of ball bearings placed within a race and which face inwardly to contact the upper surface of one of the balls 322, 324, 326 and 342 (FIG. 8). Alternately, the cover can have complementary idler balls configured to match with balls 322, 324, 326 and 342 in the base unit 320. Such a configuration is similar to the side view of the document scanning apparatus 100 of FIG. 4, except that the rollers 112, 114, 122 and 124 are replaced with balls. Such a configuration increases the pressure applied to the document by the document positioning device, which can improve the traction force applied by the driven ball to the document. Further, the alignment device can comprise a first set of magnets 332, 334, 336 and 338 located in the base unit 320, and which are configured to interact with a second set of magnets in the cover.

Figure 9:
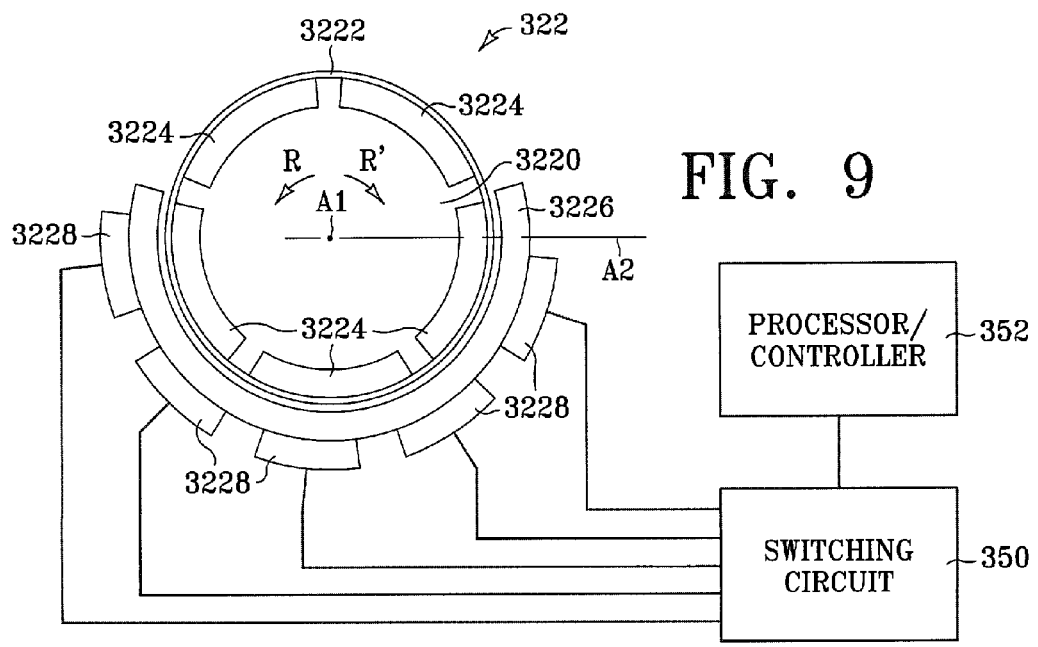
FIG. 9 is a side elevation view depicting a document positioning device which can be used with the apparatus depicted in FIG. 8.
Figure 10:
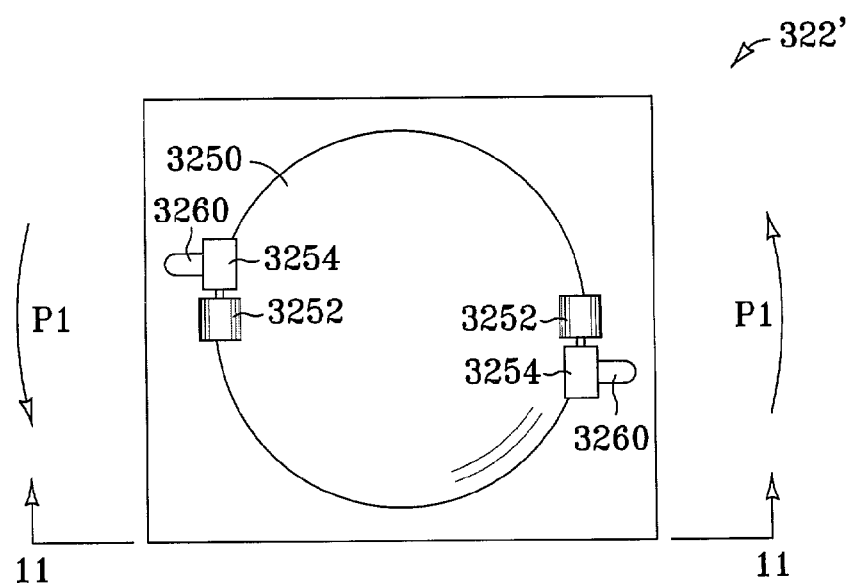
FIG. 10 is a plan view depicting another document positioning device which can be used with the apparatus depicted in FIG. 8.
Figure 11:
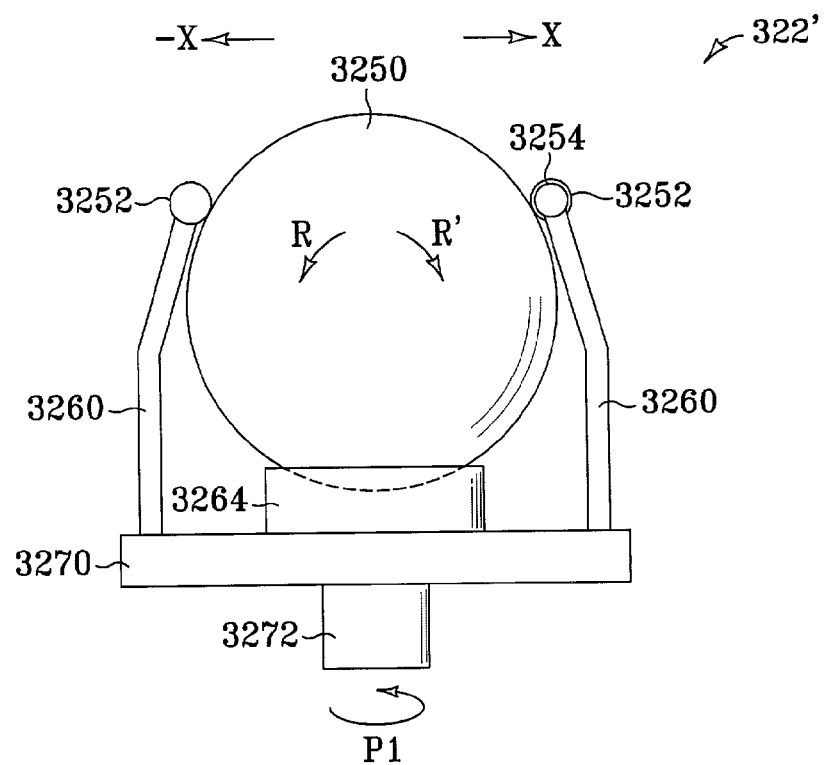
FIG. 11 is a side elevation view of the document positioning device depicted in FIG. 10.

FIGS. 9 through 11 depict two different methods by which one (or more) of the balls 322, 324, 326 and 342 can be driven to thus act as a document positioning device. With respect to FIG. 9, the driven ball system 322 of FIG. 8 is depicted in a side elevation sectional view (although cross section lines have been eliminated to simplify the drawing and facilitate understanding). The driven ball system 322 includes a ball 3220 having a tactile outer coating 3222 which can facilitate engagement of a document by the ball. Set within the ball 3220 are a plurality of fixed permanent magnets 3224. The ball is positioned within a cradle 3226. Positioned around the outside of the cradle are a plurality of electromagnets 3228. The electromagnets 3228 are connected to a switching circuit 350 which selectively actuates the electromagnets 3229 to cause them to repel or attract the permanent magnets 3224 set within the ball 3220. The switching performed by the switching circuit 350 can be performed by a processor/controller 352. In this way the ball 3220 can be made to rotate in either direction (R or R') about axis "A1" and thus act as the document positioning device to move a document in the "X" or negative-X direction (FIG. 8). The cradle can also have another set of electromagnets (not shown) positioned orthogonal to the first set of electromagnets 3228 to allow the ball 3220 to be rotated about axis "A2". In this way a single driven ball 3220 can be used to position a document in both the "X" and "Y" directions (FIGS. 5 and 8).

FIG. 10 depicts a plan view of a different driven-ball document positioning device 322'. FIG. 11 depicts a side elevation view of the document positioning device 322' depicted in FIG. 10. With respect to FIGS. 10 and 11, the document positioning device 322' includes a ball 3250 which can have a tactile outer coating to facilitate engagement of a document by the ball 3250. The ball is set within a cup 3254 (FIG. 11) which is supported on a frame 3270. The ball can freely rotate within the cup 3264. Two power-driven capstans 3252 (each driven by a drive motor 3254) contact the ball 3250 above the equator of the ball. The driven capstans 3252 can drive the ball 3250 in directions R and R' to thus move a document placed on top of the ball in respective directions "X" and negative-X (FIGS. 5 and 8). The driven capstans 3252 and drive motors 3254 can be mounted on support members 3260, which in turn are connected to the frame 3270. The frame 3270 is supported on a frame positioner 3272 (such as a solenoid) which allows the frame 3270 to be rotated in direction "P1" (as well as in the opposite direction). Thus, by using the frame positioner 3272 to rotate the frame 3270 by ninety degrees, the positioning direction of the ball 3250 can be rotated so that the ball can move a document in the "Y" direction (FIGS. 5 and 8). Accordingly, the document positioning device 322' of FIGS. 10 and 11 can be used to position a document in both the "X" and "Y" directions with respect to a platen (340, FIG. 8) or an optical scanning device (328, FIG. 8). When the frame positioner 3272 is actuated to rotate the frame 3270, the ball 3250 will pivot about a document in contact with the top of the ball (as viewed in FIG. 11). Generally, this will not cause significant friction between the ball 3250 and the document, resulting in movement of the document when the frame 3270 is rotated. However, in the event that the document is found to experience significant movement during rotation of the frame 3270, then the frame (and consequently the ball 3250) can be mounted on a retractable base (not shown) allowing the ball 3250 and frame 3270 to be moved downward (as viewed in FIG. 11) so that the ball does not contact the document during the rotation of the frame 3270.

Figure 18:
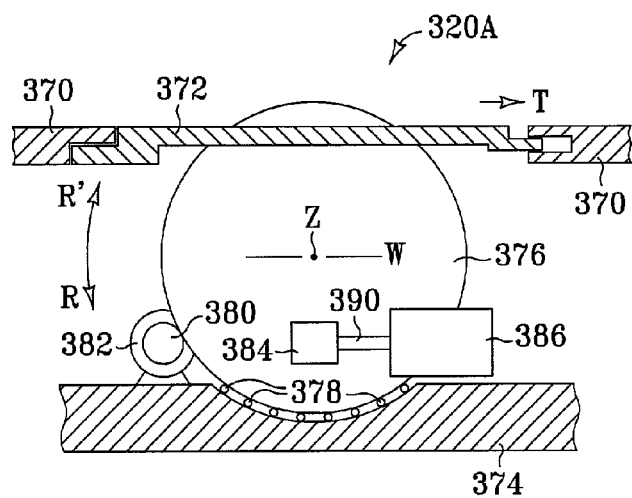
FIG. 18 is side view depicting another document positioning device which can be used with the apparatus depicted in FIG. 8.

A third type of driven ball assembly which can be used in the base unit 320A of a document scanning apparatus in accordance with the present invention is depicted in FIG. 18 in side elevation view. The drive ball assembly includes a ball 376 which rests in a curved pocket in the bottom panel 374 of the base unit 320A. In the example shown, a plurality of ball bearings 378 are disposed between the curved pocket and the ball 376 to reduce friction between the ball 376 and the bottom panel 374. The ball 376 protrudes slightly above the top panel 370 of the base unit 320A. A removable panel 372 can be moved in direction "T" so that the ball 376 can be removed for cleaning or replacement. A first drive motor 382, which is supported on the bottom panel 374, drives a first capstan 380 which is in contact with the ball 376. The capstan 380 can be used to drive the ball 376 in directions R and R' about axis "Z" (which projects into the sheet on which the figure is drawn). A second capstan 384, which is in contact with the ball 376A, is driven by a second drive motor 386 (via shaft 390). The capstan 384 can be used to drive the ball 376 in "up" and "down" directions about axis "W". Thus, the capstans 380 and 384 can be used to drive the ball in "X" and "Y" directions (FIG. 8), and thus position an oversized document placed over the base unit 320A (FIG. 18). The capstans 380 and 384 can also be configured to selectively individually retract away from the ball 374 to reduce friction when the non-retracted capstan is driving the ball. This can be accomplished, for example, by mounting the motors 382 and 386 on pivoting frames and then using an actuator, such as a solenoid, the pivot the frame.

Figure 12:
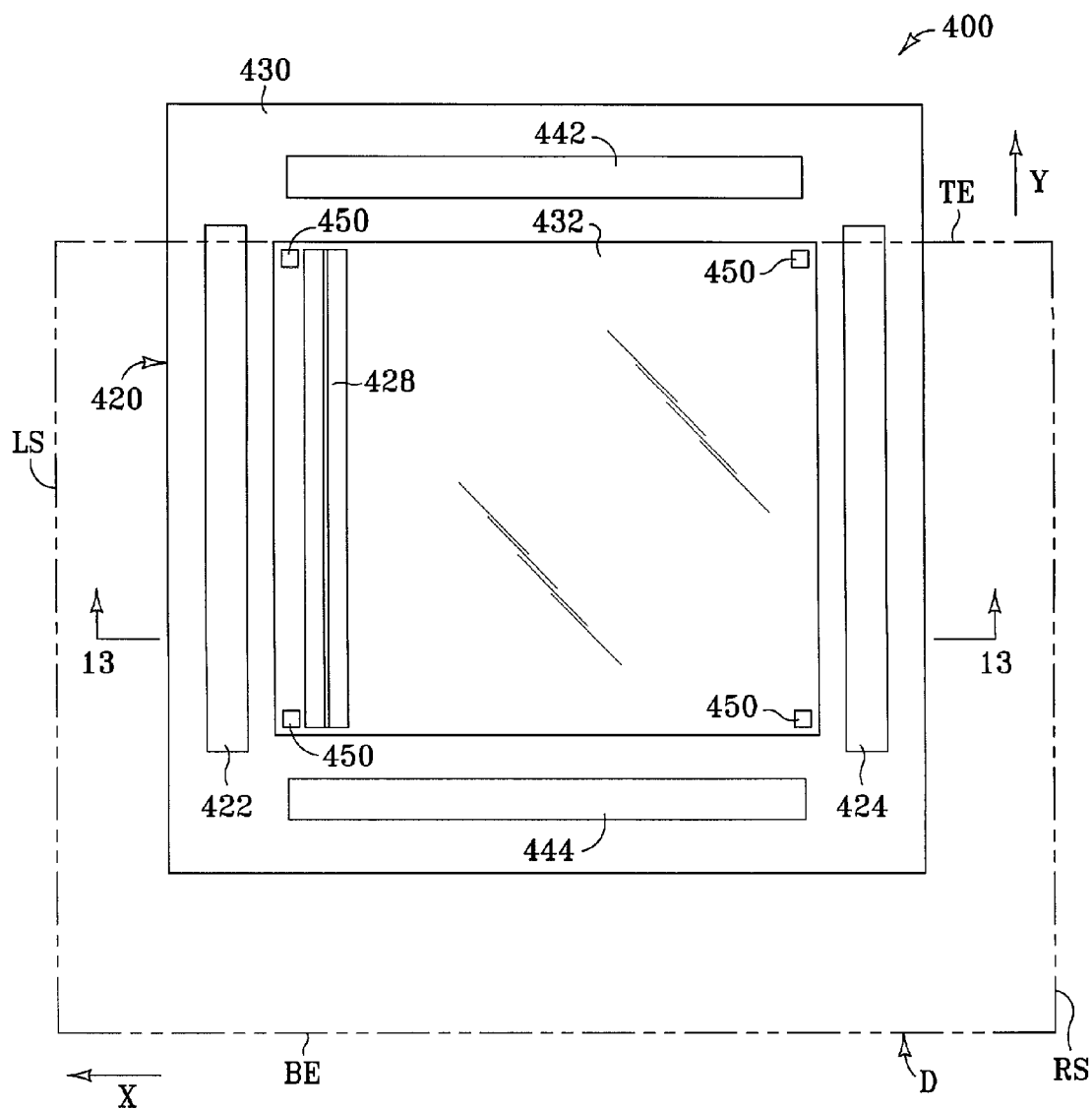
FIG. 12 is a plan view depicting a document scanning apparatus in accordance with a third embodiment of the present invention.

A variation on the document scanning apparatus 300 of FIGS. 8, and 100 of FIG. 4, is depicted in a plan view in FIG. 12. The document scanning apparatus 400 of FIG. 12 includes a base unit 420 and a cover (not shown) which can be similar to the cover 110 of the document scanning apparatus 100 of FIG. 4. The base unit 420 of the document scanning apparatus includes a main body 430 which supports an optical scanning device 428. The base unit 420 further includes a plurality of rollers 422, 424, 442 and 444, which are similar to rollers 122 and 124 of FIG. 4, except that rollers 442 and 444 are mounted orthogonal to rollers 422 and 424. Specifically, at least one of the first set of rollers 422 or 424 can be a power driven roller configured to act as a document positioning device to selectively move a document "D" in the "X" and negative-X directions, in the manner described above with respect to roller 122 of FIG. 4. Likewise, at least one of the second set of rollers 442 or 444 can be a power driven roller configured to act as a document positioning device to selectively move a document "D" in the "Y" and negative-Y directions. Preferably, all of the rollers 422, 424, 442 and 444 are powered rollers. In this manner, the document can always be pulled into position, rather than being pushed into position. "Pushing" the document into position may result in the document binding between the cover and the platen. For example, if only roller 424 were configured to move the document in the "X" direction (and the negative-X direction) and roller 422 were an idler roller, then roller 424 would be required to "push" the document "D" in the "X" direction.

Figure 13:
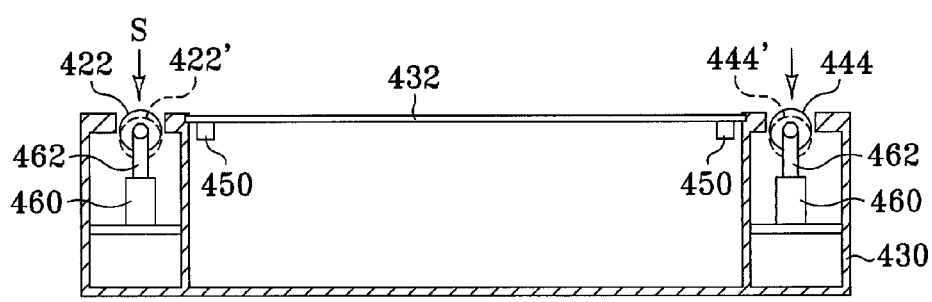
FIG. 13 is a side elevation sectional view of the document scanning apparatus depicted in FIG. 12.

As is apparent, if all four rollers 422, 424, 442 and 444 are positioned to simultaneously contact a document placed over the base unit 420, then movement of the document across the base unit can be inhibited by rollers oriented orthogonally to the direction of movement. For example, while the document "D" is moved in the "X" direction, then it will scuff across rollers 442 and 444. Accordingly, the document scanning apparatus 400 preferably is configured to disengage rollers from contacting a document when the document is to be moved in a direction in which the rollers can inhibit free movement of the document. One configuration for accomplishing this is shown in FIG. 13, which depicts a side elevation sectional view of the document scanning apparatus 400 of FIG. 12. In this configuration the rollers 422 and 424 are selectively retractable to respective positions 422' and 424' to thereby move the rollers out of contact with a document placed over the platen 432. This can be accomplished by supporting each roller 422 and 424 on support arms 462, which are extensibly connected to actuators 460. Actuators 460 can be, for example, solenoids supported by the base unit body 430. Rollers 442 and 444 (FIG. 12) can be similarly configured so that they can be retracted out of contact with a document placed over the platen 432. Thus, with respect to FIG. 12, when the document "D" is to be moved in the "X" direction by rollers 422 and/or 424, these rollers are extended to contact the document, while rollers 442 and 444 are retracted so as to not contact the document. Similarly, when the document "D" is to be moved in the "Y" direction by rollers 442 and/or 444, these rollers are extended to contact the document, while rollers 422 and 424 are retracted.

Figure 16:
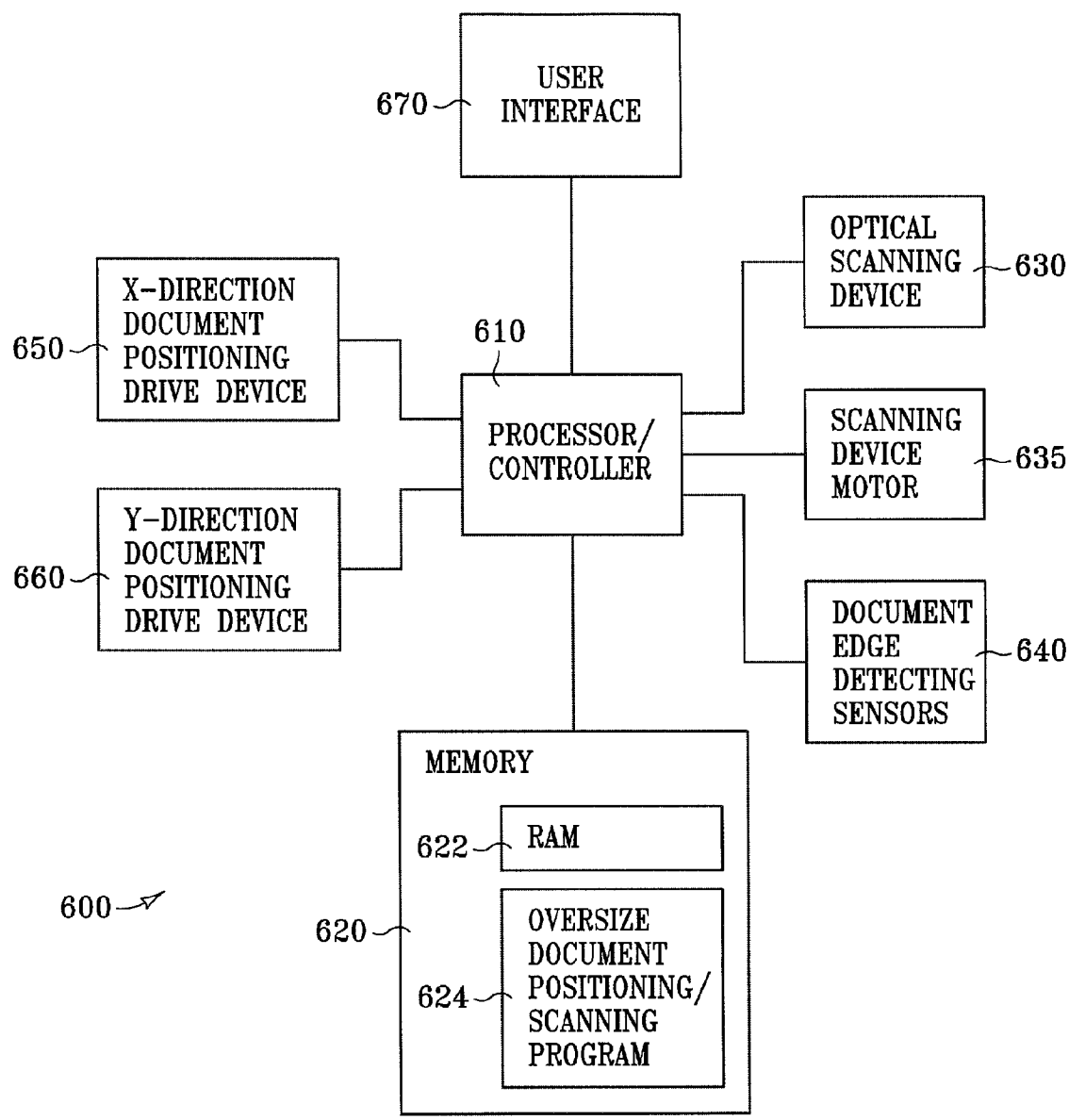
FIG. 16 depicts a schematic diagram of components which can be used to implement the methods of the present invention.

Turning now to FIG. 16, a schematic diagram depicts an embodiment of an exemplary system 600 which can be used to automate the document scanning apparatus 100 (FIG. 4), 300 (FIG. 8) and 400 (FIG. 12). The system 600 includes a processor or controller 610 which coordinates the operation of the other components, and also can be used to manage data transfer functions, as will be described below. The system 600 further includes a memory device 620 which can be accessed by the processor 610. The memory device can be, for example, a semiconductor memory device or a disk-type memory device (such as a magnetic disk). The memory device 620 can have a random access memory component 622 which allows the processor 610 to temporarily store data in the memory device. The memory device 620 preferably includes an "Oversized Document Positioning/Scanning Program" (or "Oversized Document Program"), which comprises a series of executable instructions which can be executed by the processor 610 to allow the processor to cause various components of the system 600 to function.

The document scanning apparatus system 600 can further include a user interface 670 which can allow a user to enable, disable or modify the Oversized Document Program. For example, a user can access the user interface 670 to indicate that a document is oversized in only one direction, and in which direction ("X" or "Y") the document is oversized. The user interface can also be used to provide information to a user, such as instructions to place a document on the base unit of the scanning apparatus, or that the scanning process has been completed.

The various operational components of the document scanning apparatus system 600 have generally been described above. These operational components include an optical scanning device (128, FIG. 4) which can be moved across a platen (132, FIG. 5) by a scanning device motor 635 (FIG. 16). The scanning device motor 635 can be actuated by the processor 610, and signals generated by the scanning device 428 can be transmitted to the memory device 620 via the processor 610. As shown, the scanning system 600 further includes an "X" direction document positioning drive device 650 (e.g., driven balls (322, 324, 326 and/or 342, FIG. 8), or rollers (422 and/or 424, FIG. 12)), and a "Y" direction document positioning drive device 660 (e.g., driven balls (322, 324, 326 and/or 342, FIG. 8), or rollers (442 and/or 444, FIG. 12)). The document positioning devices 650 and 660 can be actuated by the processor 610.

The document scanning system 600 can further include a document edge detector 640. The operation of the document edge detector 640 will be more fully described below, but generally its function is to transmit a signal to the processor 610 in response to detecting one of the presence or absence of an edge of a document proximate at least one edge of the platen, such as platen 432, FIG. 12. In this way the processor 610 can ascertain whether a document placed over the platen should be moved or not, and thus whether or not to actuate the document positioning devices 650, 660.

One example of a document edge detector is shown in FIG. 12, wherein four sensors 450 are positioned adjacent each of the four corners of the platen 432. In the following example, the sensors are provided with a light source (such as an LED), and a light detector configured to detect reflected light and generate a signal in response thereto.

Figure 14:
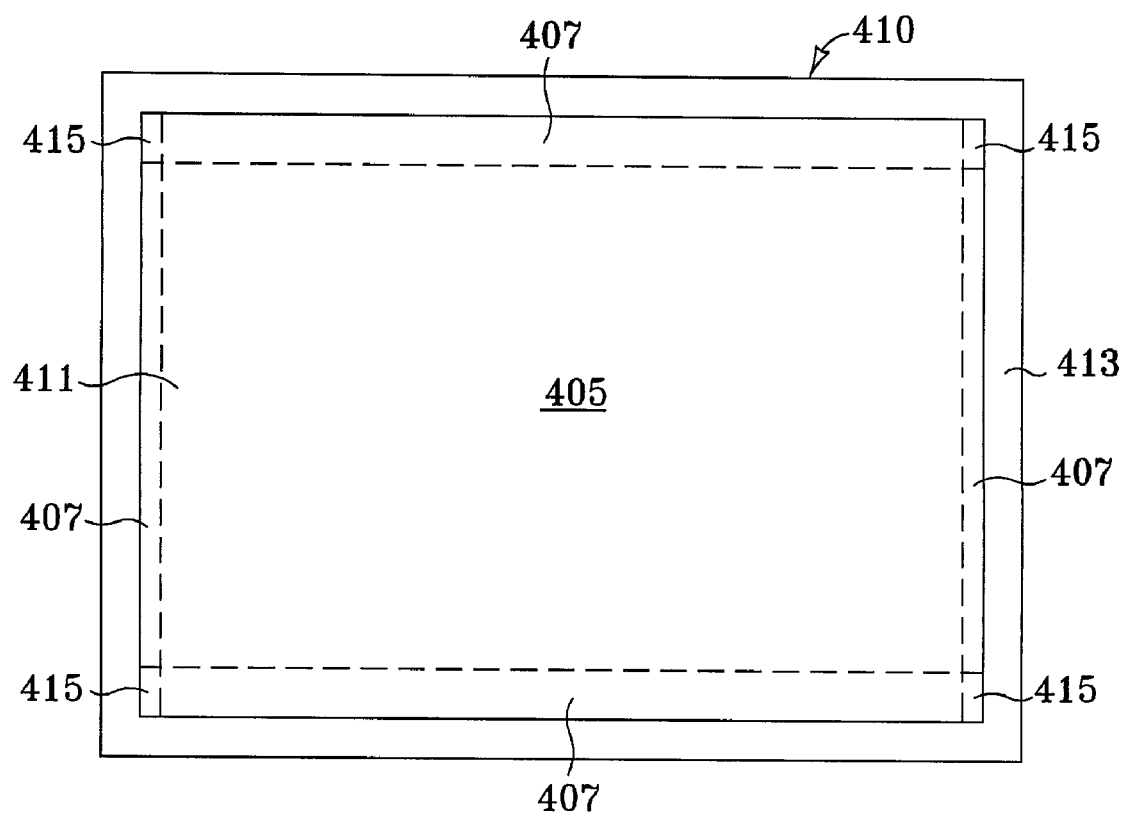
FIG. 14 is a bottom view of a scanner cover which can be used with the document scanning apparatus depicted in FIG. 12.

Turning to FIG. 14, a document scanning apparatus cover 710 of the present invention is shown in a bottom view. That is, the area depicted in the figure will be the side of the cover placed over the base unit of the document scanning apparatus. The cover 710 can be used, for example, with the document scanning apparatus base 720 of FIG. 12. The cover 710 includes a bright reflective surface 405 (preferably white) attached to a support platform 413. The cover can further include alignment devices (not shown) which can take any of the forms described above to maintain alignment between the cover 710 and the base unit 720 (FIG. 12) when the cover is placed over the base unit.

The reflective surface 405 of the cover 710 is configured to cover the platen 432 (FIG. 12) of the base unit when the cover is placed over the base unit. In this example, the scannable area of the platen 432 is less than the entire area of the platen, and specifically includes only the area 411 defined on the reflective surface 405 (FIG. 14), while the perimeter areas 407 of the reflective surface 405 are not within the scannable area. Nonetheless, the perimeter areas 407 will still lie over the platen 432 (FIG. 12), and thus light from the edge detector sensors 450 will be able to contact the reflective surface 405 (FIG. 14) in the perimeter areas. As can be seen, the four corners 415 of the reflective surface 405 are blacked-out so that they are non-reflective. These dark areas 415 will align with the sensors 450 (FIG. 12) when the cover 710 is placed over the base unit 420. Accordingly, light from the edge detector sensors 450 will not be reflected from these dark areas 415 when only the platen lies between the dark areas 415 and the sensors 450. However, light will be reflected from a document that is placed between the sensors 450 and the dark areas 415. In this way, the sensors 450 will be able to detect when a portion of a document lies beyond the scannable area 411. Once the edge of a document is moved from the perimeter area 407 onto the scanable area 411, then the dark areas 415 nearest that edge of the document will be exposed. Consequently, the respective sensors 450 will indicated that no further movement of the document is required to place the document over the scannable area (unless an orthogonal edge of the document is determined to still lie beyond the scannable area).

Figure 17:
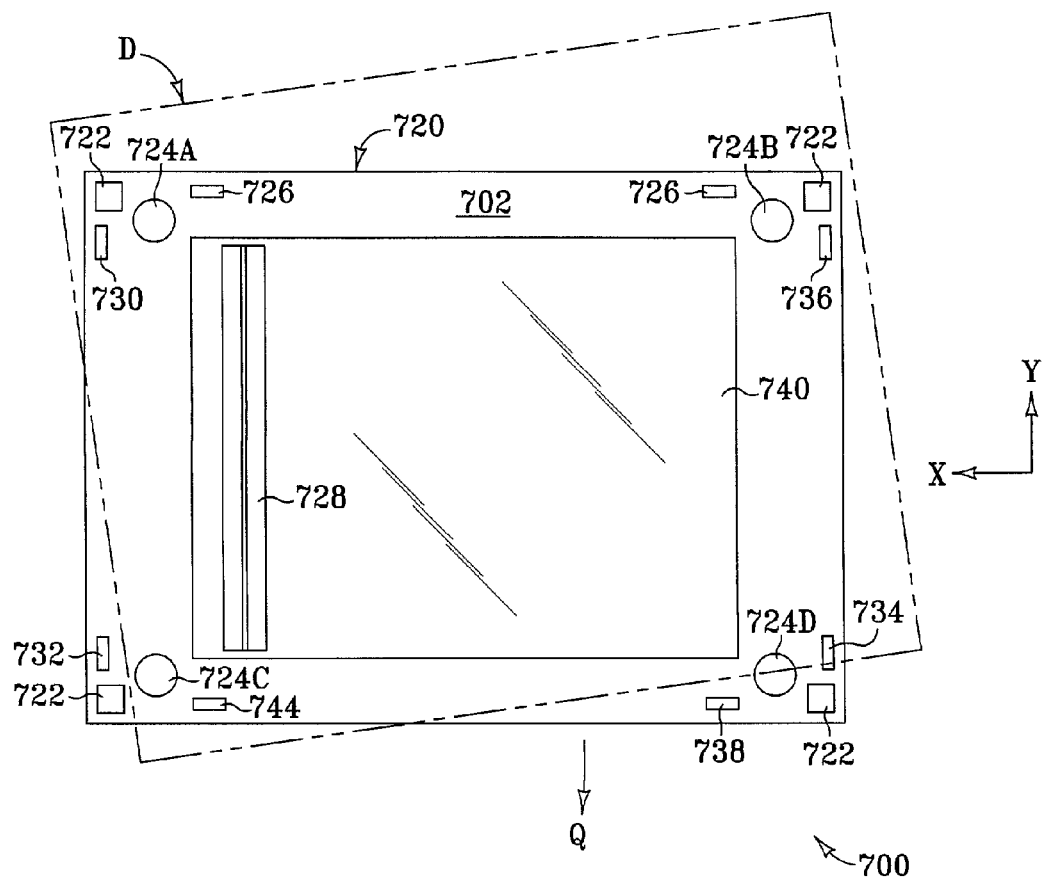
FIG. 17 is a plan view depicting a document scanning apparatus in accordance with a fourth embodiment of the present invention.

A further embodiment of a document scanning apparatus 700 in accordance with the present invention is depicted in a plan view in FIG. 17. As can be seen, the document scanning apparatus 700 is similar to the document scanning apparatus 300 of FIG. 8. The document scanning apparatus 700 includes a cover, which is not shown for the sake of simplicity, but can be similar to covers 110 (FIG. 4) and 410 (FIG. 14), the document scanning apparatus 700 also includes a base unit 720 which includes a platen 740 and an optical scanning device 728. The alignment device used in the example depicted in FIG. 17 comprises four magnets 722 which are positioned in the four corners of the base unit 720 near the upper surface 702 of the base unit. The magnets are configured to align with complementary magnets in the cover (not shown) in the manner described above with respect to magnets 116 and 126 in FIG. 4. The document positioning device used in the apparatus 700 includes four driven balls 724A–D, each ball located proximate a corner of the upper surface 702 of the base unit 720. The driven balls can operate, for example, like the driven balls depicted in FIGS. 9, 10, 11 and 18, described above.

The document scanning apparatus 700 of FIG. 17 further includes eight edge detectors which can operate similar to the edge detectors 450, described above with respect to FIGS. 12 and 14. In the embodiment depicted in FIG. 17, the edge detectors are positioned at the upper surface 702 of the base unit 720, rather than being placed below the platen, as in FIG. 12. In the apparatus 700, two spaced-apart edge detectors 730 and 732 are positioned adjacent the left edge of the base unit 720, two spaced-apart edge detectors 726 are positioned near the top edge of the base unit, two spaced-apart edge detectors 736 aid 734 are positioned near the right edge of the base unit, and two spaced-apart edge detectors 744 and 738 are positioned near the bottom edge of the base unit. As can be seen, the edge detectors are arranged such that each corner of the upper surface 702 of the base unit 720 includes two edge detectors oriented at ninety degrees with respect to one another. For example, the upper left corner of the base unit 720 includes edge detectors 730 and 726. At each corner of the base unit 720, a driven ball 726 is located inward of the edge detectors at the corner, and outward of the respective corner of the platen 740. The edge detectors depicted in FIG. 17 can be the document edge detecting sensors 630 of FIG. 16, which are connected to processor 610.

The configuration of the document scanning apparatus 700 depicted in FIG. 17 is particularly useful for aligning an oversized document with respect to a platen (and thus, the scannable area of the platen) prior to (or during) the process of moving the document about the scanable area for scanning in accordance with the present invention. For example, an oversized document "D" is depicted as being placed over the base unit 720. As can be seen, the edges of the document are misaligned with the edged of the platen. That is, the left edge of the document "D" is not parallel with the left edge of the platen 740. Although the misalignment is exaggerated for purposes of illustration, this type of misalignment can occur when a user initially places the document "D" over the platen 740. Misalignment can also occur during the process of moving the document over the scannable area.

In the example shown in FIG. 17, the document "D" can be aligned over the base unit 720 using the edge detectors 726, 730, 732, 744, 738, 736 and 734, in conjunction with a processor (610, FIG. 16) and an Oversized Document Positioning Program (624) as follows. Edge detectors 726 and 744 and detect the document "D", while edge detector 738 does not detect the document. Likewise, edge detectors 730, 736 and 734 and detect the document "D", while edge detector 732 does not detect the document. Provided with this information, the processor 610 (FIG. 16), using the Document Positioning Program 624, is able to determine that the document "D" is misaligned with respect to the platen 740, and that the document should be rotated clockwise in direction "Q" in order to properly align the document. The processor 61 0 then actuates the driven balls 724A and 724C to move the left edge of the document "D" in the "Y" direction, while driven balls 724B and 724D are actuated to move the document "D" in the opposite-Y direction. This causes the document "D" to rotate in direction "Q".

The rotation of the document "D" continues until the two edge detectors on each edge of the base unit are either both covered by the document, or both not-covered by the document. Once this condition occurs, proper alignment of the document with respect to the base unit is indicated. To verify this alignment, the document can be moved with in a single direction (for example, direction "X" or "Y") to uncover edge detectors along one side which were previously both covered. If both of the previously-covered edge detectors are uncovered at the same time (which the edge detectors will be able to detect), then the document is correctly aligned. However, if the previously-covered edge detectors are not both uncovered at the same time, then additional alignment of the document can be performed in the manner described above.

Figure 15B:
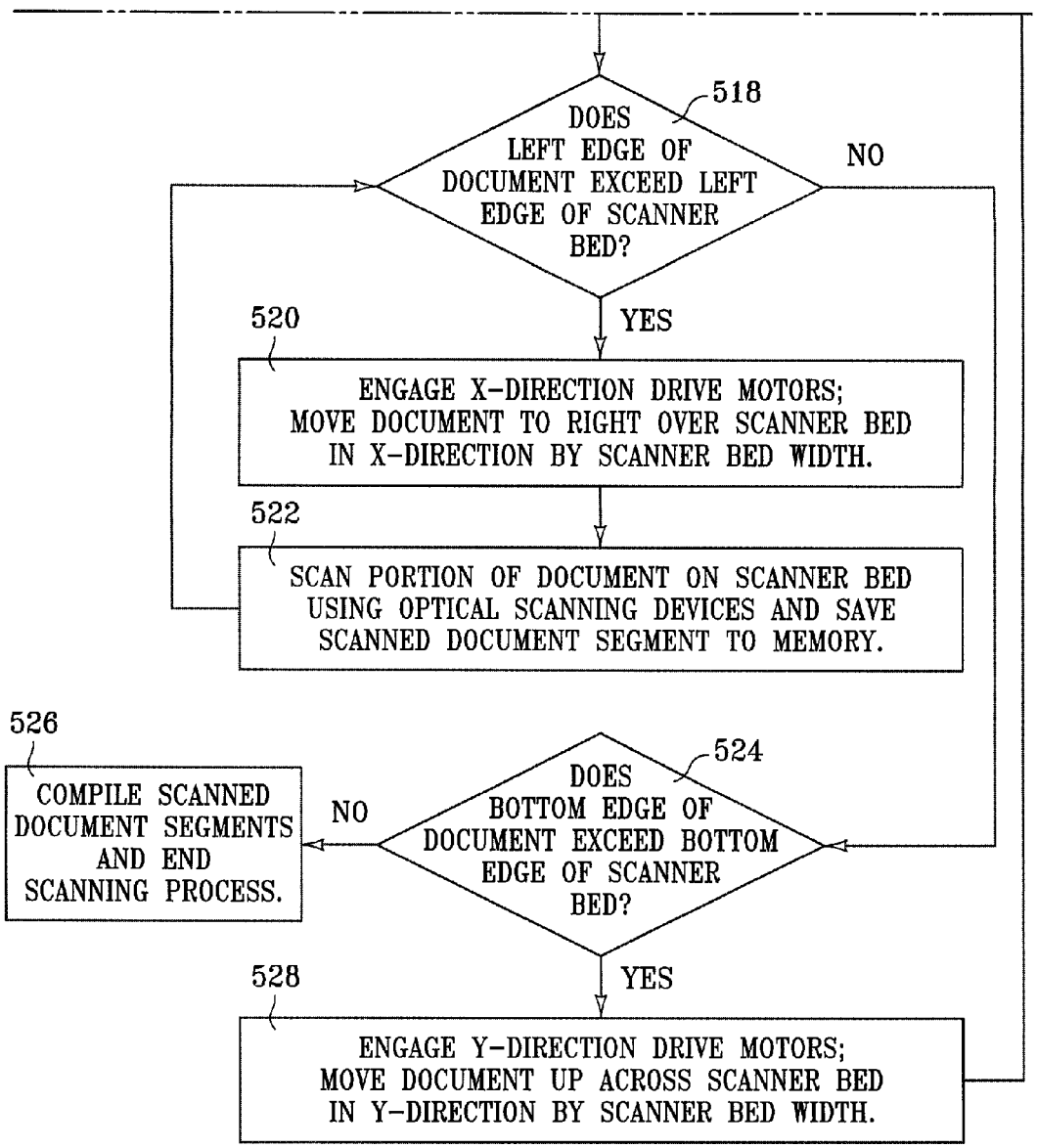

I will now describe one example of how a document scanning apparatus in accordance with the present invention can be operated to automatically scan the entire area of an oversized document. FIGS. 15A and 15B together depict a flowchart 500 of steps which can be implemented as computer executable steps, and thus comprise the Oversize Document Scanning Program 624 of FIG. 16. It is understood that the example depicted in FIGS. 15A and 15B is exemplary only, and that different steps can be used, or the steps performed in a different sequence, to operate the apparatus of the present invention in accordance with the methods of the present invention. In the following discussion, we will assume that the steps of the flowchart 500 are executed by a processor (such as processor 610, FIG. 16), which is used in conjunction with a document scanning apparatus of the present invention, such as apparatus 400 of FIG. 12.

The general process described by the flowchart 500 is that an oversized document is placed over the scanable area of a platen of a document scanning apparatus. The document is incrementally moved over the scannable area by a document positioning device. The increments of movement are the length or width of the scannable area. Between incremental moves, the portion of the document which is positioned over the scannable area is optically scanned. Preferably, the document is initially moved left-to-right until the entire length of the document is scanned; if the width of the document exceeds the width of the scannable area, then the document is moved up by the width of the scannable area. Thereafter the document is incrementally moved right-to-left. This sequence is continued until the entire document has been scanned. The result is a series of scanned document segments which can later be compiled into an overall scanned image.

Turning now to FIG. 15A, at step 502 the Oversized Document Scanning Program is enabled, as for example by the user interface 670 of FIG. 16. The document is positioned on the platen (or "scanning bed") to align one corner of the document in the upper left corner of the scannable area of the platen. This step can be performed manually by the user. At step 504 the portion of the document on the platen (i.e., the portion within the scannable area of the platen) is optically scanned using an optical scanning device (such as 428 of FIG. 12). The scanned document segment is then stored in computer readable memory (such as RAM 622, FIG. 16). At step 506 the processor then checks to determine whether the right edge of the document exceeds the right edge of the scannable area. For example, with respect to FIG. 12, the right side "HRS" of the document "D" exceeds the right edge of the scannable area (on the platen 432). This determination can be accomplished using the edge detector sensors 450 and the cover 710 (FIG. 14), described above. However, if the right side of the document is within the scannable area, then at step 510 a determination is made whether the bottom edge of the document (e.g., bottom edge "BE" of document "D" in FIG. 12) exceeds the bottom edge of the scannable area. If the bottom edge of the document does not exceed the bottom edge of the scannable area, then at step 512 the document segments (in this case, only one) are compiled and the scanning process is terminated. That is, if it is determined at steps 506 and 510 that both the right edge and the bottom edge (i.e., the lower right corner) of the document are within the scannable area, then this indicates that the document has been completely scanned, since at step 502 the document was initially placed with its upper left corner in the upper left corner of the scannable area.

However, if at step 506 it is determined that the right edge of the document exceeds the right edge of the scannable area, then at step 508 the document positioning device which is used to move the document in the "X" direction (see FIG. 12) is engaged, and the document is moved to the left by the length of the scannable area. Thereafter the program returns to step 504 and the portion of the document placed over the scannable area is scanned. As can be seen, this sequence of moving the document to the left and scanning it is continued until the right edge of the document no longer exceeds the right edge of the scannable area (as determined at step 506). One the right edge of the document is brought within the scannable area and scanned (step 504), then at step 510 (described above) the determination is made whether the bottom edge of the document exceeds the bottom edge of the scannable area. If so, at step 514 the document positioning device which is used to move the document in the "Y" direction (see FIG. 12) is engaged, and the document is moved "up" by the width of the scannable area. The portion of the document positioned over the scannable area is then scanned at step 516. At step 518 (FIG. 15B) a determination is made whether the left edge of the document (e.g., "LE" of document "D", FIG. 12) exceeds the left edge of the scannable area. If not, then a check is again made at step 524 to determine whether the bottom edge of the document exceeds the bottom edge of the scannable area. If not, then at step 526 the scanned document segments are compiled and the scanning process is terminated.

If at step 518 it is determined that the left edge of the document exceeds the left edge of the scannable area, then at step 520 the document positioning device which is used to move the document in the opposite direction of "X" (see FIG. 12) is engaged, and the document is moved to the right by the length of the scannable area. At step 520 the portion of the document positioned over the scannable area is then scanned, and the process (steps 518 and 520) is repeated until the left edge of the document lies within the scannable area. At this point the process moves to step 524 to determine if the bottom edge of the document exceeds the bottom edge of the scannable area (as described above). If the bottom edge of the document exceeds the bottom edge of the scannable area, then at step 528 the document positioning device which is used to move the document in the direction "Y" (see FIG. 12) is engaged, and the document is moved up by the width of the scannable area. The program then returns to step 504. As is evident, the process of shifting the document to the left, up, to the right, up and back to the left is continued until the entire document has been scanned. Thereafter, all of the scanned document segments can be compiled by the process to provide a single scanned image of the document.

A further embodiment of the present invention provides for a method of optically scanning an oversized document. The method includes placing a first portion of the document (such as document "D" of FIG. 12) over a platen (such as 432, FIG. 12) so that a second portion of the document is not placed over the platen. (For example, the second portion of the document can be the portion of the document "D" which is to the right of the portion of the document placed on platen 432 in FIG. 12.) The first portion of the document is then optically scanned by moving an optical scanning device (as 428, FIG. 12) past the first portion of the document. The document is then automatically moved in a first direction so that the second portion of the document is placed over the platen. This can be accomplished, for example, by using the document positioning devices 422, 424, 442, and/or 444 of FIG. 12, as controlled by the exemplary Document Positioning Program 500 (FIGS. 15A and 15B), and 624 (FIG. 16). The second portion of the document is then optically scanned by moving the optical scanning device past the second portion of the document. Further, when the document is placed over the platen and a third portion of the document is not placed over the platen (such as the portion of the document "D" which is below the platen 432 in FIG. 12), the method can further include automatically moving the document in a second direction which is orthogonal to the first direction. (For example, the document "D" of FIG. 12 can be moved in the "Y" direction, which is orthogonal to the "X" direction.) Thus, the third portion of the document will be placed over the platen. Thereafter, the third portion of the document can be optically scanned by moving the optical scanning device (e.g., 428, FIG. 12) past the third portion of the document.

Further, when the document is defined by a first edge (as edge "RS" in FIG. 12) which is not placed over the platen when the first portion of the document is placed over the platen, the method can further include automatically and sequentially moving the document a plurality of times in the first direction over the platen until the first edge of the document is placed over the platen. The document is optically scanned each time the document is sequentially moved over the platen in the first direction. This can correspond to the sequential steps 506, 508 and 504 of the flowchart 500 of FIG. 15A. Likewise, the document can be defined by a second edge (as bottom edge "BE" of document "D" of FIG. 12) which is orthogonal to the first edge (as edge "RS") and which is not placed over the platen when the first portion of the document is placed over the platen. In this instance, the method can further include automatically and sequentially moving the document a plurality of times in a second direction (e.g., direction "Y", FIG. 12) over the platen until the second edge of the document is placed over the platen. The document is optically scanned each time the document is sequentially moved over the platen in the second direction. This can correspond to the sequential steps 510, 514 and 516 of the flowchart 500 of FIG. 15A.

To paraphrase the above description of the method of the present invention, an oversized document is automatically and sequentially moved over a scannable area in one direction (or two orthogonal directions), and optically scanned between sequential moves, so that ultimately the entire document is scanned by an optical scanning device.

The method of the present invention can further include scanning the first and second portions of the document to generate respective first and second scanned image segments. The first and second scanned image segments can then be automatically compiled into a single scanned image. In this way a user is not required to manually assemble a plurality of scanned image segments of an oversized document to obtain a single scanned image of the oversized document.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A document scanning apparatus comprising:
   a base unit;
   an optical scanning device located within the base unit;
   a cover freely removable from the base unit; and
   a document positioning device configured to move a document in a first direction, and in a second direction which is orthogonal to the first direction; with respect to the optical scanning device when the document is positioned between the base unit and the cover.

2. The document scanning apparatus of claim 1, and wherein the document positioning device comprises a cylindrical powered roller.

3. The document scanning apparatus of claim 1, and wherein the document positioning device comprises a driven ball.

4. The document scanning apparatus of claim 3, and wherein the driven ball is configured to be selectively driven in either the first direction or in the second direction.

5. The document scanning apparatus of claim 1, and further comprising an alignment device configured to maintain the cover in a relatively fixed spatial position with respect to the base unit when the document positioning device is moving a document.

6. The document scanning apparatus of claim 5, and wherein the alignment device comprises a first magnet located in the cover, and a second magnet located in the base unit, and wherein the magnets are in proximity to one another when the cover is aligned over the base unit.

7. The document scanning apparatus of claim 5, and wherein the base unit is defined by four corners and the cover is defined by four corresponding corners, and further wherein the alignment device comprises magnets located adjacent each of the four corners defining the base unit and the four corresponding corners defining the cover.

8. The document scanning apparatus of claim 7, and wherein the document positioning device comprises a first driven ball located adjacent a first one of the four corners which define the base unit and a second driven ball located adjacent a second one of the four corners which define the base unit.

9. The document scanning apparatus of claim 8, and further comprising a first idler ball located adjacent a third one of the four corners which define the base unit and a second idler ball located adjacent a fourth one of the four corners which define the base unit.

10. The document scanning apparatus of claim 5, and wherein:
    the document positioning device comprises a cylindrical powered roller positioned within the base unit; and
    the alignment device comprises an arcuate bearing surface defining a pocket in the cover and configured to receive at least a portion of the powered roller therein when the cover is aligned on the base unit.

11. The document scanning apparatus of claim 5, and wherein:
    the document positioning device comprises a cylindrical powered roller; and
    the alignment device comprises a plurality of parallel, spaced apart cylindrical bearings configured to contact the powered roller when the cover is aligned on the base unit.

12. The document scanning apparatus of claim 5, and further comprising a rectangular platen defined by a first side and a second orthogonal side and supported in th base unit, and wherein the alignment device comprises a first powered roller located adjacent the first side of the platen and a second powered roller located adjacent to the second side of the platen.

13. The document scanning apparatus of claim 12, and wherein the platen is further defined by a third side opposite the first side, and a fourth side opposite the second side, and wherein the alignment device further comprises a third powered roller located adjacent the third side of the platen and a fourth powered roller located adjacent to the fourth side of the platen.

14. The document scanning apparatus of claim 13, and wherein the powered rollers are selectively retractable to move out of contact with a document placed over the platen.

15. The document scanning apparatus of claim 1, and wherein the document positioning device is located within the base unit.

16. A document scanning apparatus comprising:
    an optical scanning device;
    a document positioning device configured to position a document with respect to the optical scanning device;
    a processor;
    a document positioning program configured to be executed by the processor and cause the processor to actuate the document positioning device; and
    a platen over which the document is positioned by the document positioning device, and wherein:
    the optical scanning device is located adjacent the platen; and
    the platen is defined by at least one edge, the apparatus further comprising a document edge detector located proximate the at least one edge of the platen, and wherein:
    the document edge detector is configured to transmit a signal to the processor in response to detecting one of the presence or absence of an edge of a document proximate the at least one edge of the platen; and
    the document positioning program is further configured to cause the processor to actuate the document positioning device when the document edge detector does not detect the edge of a document.

17. A document scanning apparatus comprising:
    an optical scanning device;
    a document positioning device configured to position a document with respect to the optical scanning device;
    a processor; and
    a document positioning program configured to be executed by the processor and cause the processor to actuate the document positioning device; and
    a platen over which a document is positioned by the document positioning device, and wherein:
    the optical scanning device is located adjacent the platen;
    the platen is defined by a length and a width;
    a document defined by a document width greater than the platen width, and a document length greater than the platen length, can be placed over the platen; and
    the document positioning program is further configured to cause the processor to actuate the document positioning device to move portions of the document which exceed the platen width and the platen length over the platen.

18. A document scanning apparatus comprising:
    an optical scanning device;
    a document positioning device configured to position a document with respect to the optical scanning device;
    a processor; and
    a document positioning program configured to be executed by the processor and cause the processor to actuate the document positioning device; and wherein the document positioning device is configured to selectively move the document in a first direction and in a second direction orthogonal to the first direction.

19. A method of optically scanning an oversized document, comprising:
placing a first portion of the document over a platen so that a second portion of the document is not placed over the platen;
optically scanning the first portion of the document by moving an optical scanning device past the first portion of the document;
automatically moving the document in a first direction so that the second portion of the document is placed over the platen; and
optically scanning the second portion of the document by moving the optical scanning device past the second portion of the document.

20. The method of claim 19, and wherein, when the document is placed over the platen a third portion of the document is not placed over the platen, the method further comprising:
automatically moving the document in a second direction which is orthogonal to the first direction so that the third portion of the document is placed over the platen; and
optically scanning the third portion of the document by moving the optical scanning device past the third portion of the document.

21. The method of claim 19, and further wherein the scanning of the first and second portions of the document generate respective first and second scanned image segments, the method further comprising compiling the first and second scanned image segments into a single scanned image.

22. The method of claim 19, and wherein the document is defined by a first edge which is not placed over the platen when the first portion of the document is placed over the platen, the method further comprising automatically and sequentially moving the document a plurality of times in the first direction over the platen until the first edge of the document is placed over the platen, and optically scanning the document each time the document is sequentially moved over the platen in the first direction.

23. The method of claim 22, and wherein the document is defined by a second edge which is not placed over the platen when the first portion of the document is placed over the platen, the second edge being orthogonal to the first edge, the method further comprising automatically and sequentially moving the document a plurality of times in a second direction over the platen until the second edge of the document is placed over the platen, and optically scanning the document each time the document is sequentially moved over the platen in the second direction.

24. A document scanning apparatus comprising:
abase unit;
an optical scanning device located within the base unit;
a cover freely removable from the base unit; and
a plurality of driven balls in the base unit, the drive balls configured to contact a document placed over the base unit and move the document with respect to the optical scanning device when the cover is placed over the document.

25. The document scanning apparatus of claim 24, and further comprising an alignment device configured to maintain the cover in a relatively fixed spatial position with respect to the base unit when the document positioning device is moving a document.

26. The document scanning apparatus of claim 25, and wherein:
the cover comprises a plurality of idler balls configured to mate to a corresponding driven ball in the base unit; and
the alignment device comprises a first set of magnets located in the base unit, and a corresponding second set of magnets in the cover.

27. The document scanning apparatus of claim 25, and wherein the cover includes a plurality of cup-shaped arcuate surfaces, each such surface configured to receive a corresponding one of the driven balls when the cover is placed over the base unit.

28. A document scanning apparatus comprising:
a base unit;
an optical scanning device located within the base unit;
a cover freely removable from the base unit;
a document positioning device configured to move a document in a first direction, and in a second direction which is orthogonal to the first direction, with respect to the optical scanning device when the document is positioned between the base unit and the cover;
a processor; and
a plurality of document edge detecting sensors positioned within the base unit, each edge detecting sensor configured to transmit a signal to the processor in response to detecting one of the presence or absence of an edge of a document placed over the base unit.

29. The document scanning apparatus of claim 28, and further comprising a platen defined by edges and supported by the base unit, and wherein the edge detecting sensors are positioned proximate the edges of the platen.

30. The document scanning apparatus of claim 28, and wherein: the document positioning device comprises an actuator; the processor is configured to actuate the actuator in response to a signal transmitted to the processor by a edge detecting sensor.

31. The document scanning apparatus of claim 30, and further comprising a document positioning program configured to be executed by the processor and to instruct the processor to selectively actuate the actuator.

32. A document scanning apparatus comprising:
a base unit;
an optical scanning device located within the base unit;
a cover freely removable from the base unit; and
a plurality of cylindrical powered rollers in the base unit, the powered rollers configured to contact a document placed over the base unit and move the document with respect to the optical scanning device when the cover is placed over the document.

33. The document scanning apparatus of claim 32, and further comprising a rectangular platen defined by a first edge and a second orthogonal edge and supported in the base unit, and wherein the plurality of powered rollers include a first powered roller located adjacent the first edge of the platen and a second powered roller located adjacent to the second edge of the platen.

34. The document scanning apparatus of claim 33, and wherein the platen is further defined by a third edge opposite the first edge, and a fourth edge opposite the second edge, and wherein the plurality of powered rollers include a third powered roller located adjacent the third edge of the platen and a fourth powered roller located adjacent to the fourth edge of the platen.

35. The document scanning apparatus of claim 34, and wherein the powered rollers are configured to be selectively put into and taken out of contact with a document placed over the base unit.

36. The document scanning apparatus of claim 32, and further comprising the an alignment device configured to maintain the cover in a relatively fixed spatial position with respect to the base unit when the document positioning device is moving a document, the alignment device comprising an arcuate bearing surface defining a pocket in the cover and configured to receive at least a portion of the powered roller therein when the cover is aligned on the base unit.

* * * * *

UNITED STATES PATENT AND TRADEMARK OFFICE
CERTIFICATE OF CORRECTION

PATENT NO. : 7,136,199 B2 Page 1 of 1
APPLICATION NO. : 10/039941
DATED : November 14, 2006
INVENTOR(S) : Charles Eric Cantwell It is certified that error appears in the above-identified patent and that said Letters Patent is hereby corrected as shown below:

On the title page, item (73), under "Assignee", in column 1, line 2, delete "LP." and insert -- L.P. --, therefor.

In column 6, line 52, delete "side "HRS" of" and insert -- side "RS" of --, therefor.

In column 13, line 7, delete "aid" and insert -- and --, therefor.

In column 14, line 52, delete "side "HRS" of" and insert -- side "RS" of --, therefor.

In column 17, line 8, in Claim 1, delete "direction;" and insert -- direction, --, therefor.

In column 17, line 66, in Claim 12, delete "th" and insert -- the --, therefor.

In column 19, line 55, in Claim 24, delete "abase" and insert -- a base --, therefor.

In column 21, line 6, in Claim 36, after "the" delete "an".

Signed and Sealed this

Fifth Day of May, 2009

JOHN DOLL
*Acting Director of the United States Patent and Trademark Office*